United States Patent
Lee et al.

(10) Patent No.: US 9,817,472 B2
(45) Date of Patent: Nov. 14, 2017

(54) DISPLAY APPARATUS AND CONTROL METHOD THEREOF

(71) Applicant: SAMSUNG ELECTRONICS CO., LTD., Suwon-si (KR)

(72) Inventors: Dong-heon Lee, Seoul (KR); Kwan-min Lee, Seoul (KR); Sang-hee Lee, Seoul (KR); Chang-soo Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 57 days.

(21) Appl. No.: 14/071,967

(22) Filed: Nov. 5, 2013

(65) Prior Publication Data

US 2014/0125594 A1    May 8, 2014

(30) Foreign Application Priority Data

Nov. 5, 2012    (KR) .................. 10-2012-0124214

(51) Int. Cl.
  *G06F 3/01*    (2006.01)
  *G06F 3/00*    (2006.01)
  (Continued)

(52) U.S. Cl.
  CPC .............. *G06F 3/011* (2013.01); *G06F 3/005* (2013.01); *G06F 3/0304* (2013.01); *G06F 3/0346* (2013.01); *G06F 3/04812* (2013.01)

(58) Field of Classification Search
  CPC . G06F 3/033; G06F 3/01; G06F 3/038; G06F 3/04812; G06F 3/0488; G06F 3/0346
  See application file for complete search history.

(56) References Cited

U.S. PATENT DOCUMENTS 8,194,038 B1    6/2012 Henty et al.
2009/0102788 A1*   4/2009 Nishida et al. ............... 345/158
(Continued)

FOREIGN PATENT DOCUMENTS

CN    101419498 A    4/2009
CN    101821705 A    9/2010
(Continued)

OTHER PUBLICATIONS

Communication dated Mar. 20, 2015, issued by the European Patent Office in counterpart European Application No. 13187480.2.
(Continued)

*Primary Examiner* — Michael Faragalla
(74) *Attorney, Agent, or Firm* — Sughrue Mion, PLLC (57) ABSTRACT

Embodiments disclose a display apparatus which processes an image signal to display and a control method thereof, the display apparatus including: a display device; an image processing device with processes an image signal to display an image on the display device; a detection device with detects a motion of a user; and a controller which moves a pointer corresponding to the motion detected by the detection device in a preset first mode, the pointer being displayed on the image, and moves the pointer in a preset second mode, which is different from the first mode, in response to a distance between a position where the motion is detected by the detection device and the display apparatus being changed.

25 Claims, 10 Drawing Sheets (51) Int. Cl.
*G06F 3/03*     (2006.01)
*G06F 3/0346*   (2013.01)
*G06F 3/0481*   (2013.01)

(56)            References Cited

U.S. PATENT DOCUMENTS

2010/0079404 A1*  4/2010  Degner ............... G06F 3/03547
                                                         345/174
2010/0306688 A1  12/2010  Cho et al.
2010/0306710 A1  12/2010  Poot
2010/0309122 A1* 12/2010  Abe et al. ..................... 345/157
2010/0309123 A1* 12/2010  Sawai et al. .................. 345/157
2012/0212482 A1*  8/2012  Arai .................... G06F 3/04815
                                                         345/419
2012/0218183 A1   8/2012  Givon et al.
2012/0223882 A1   9/2012  Galor et al.
2012/0268373 A1  10/2012  Grzesiak

FOREIGN PATENT DOCUMENTS

CN         101902588 A     12/2010
CN         101907936 A     12/2010
JP         201055346 A      3/2010

OTHER PUBLICATIONS

Communication from the European Patent Office issued Apr. 5, 2016 in a counterpart European Application No. 13187480.2.
Communication dated Nov. 28, 2016 issued by the European Patent Office in counterpart European Patent Application No. 13187480.2.
Communication dated Aug. 2, 2017, issued by the State Intellectual Property Office of the People's Republic of China in counterpart Chinese Patent Application No. 201310540849.3.

\* cited by examiner

FIRST MODE          SECOND MODE

FIG. 10

FIRST MODE          SECOND MODE

DISPLAY APPARATUS AND CONTROL METHOD THEREOF

CROSS-REFERENCE TO RELATED APPLICATION

This application claims priority from Korean Patent Application No. 10-2012-0124214, filed on Nov. 5, 2012 in the Korean Intellectual Property Office, the disclosure of which is incorporated herein by reference.

BACKGROUND

Field

Apparatuses and methods consistent with the exemplary embodiments relate to a display apparatus processing an image signal to display an image and a control method thereof. More particularly, exemplary embodiments relate to a display apparatus having a configuration of easily moving a pointer within an image by properly reflecting a user intent and a control method thereof.

Description of the Related Art

A related art display apparatus may be a device which processes image signals/image data input from external image sources and autonomously stored, to present images on a display unit. Available related art display apparatuses for general users may include a TV and a monitor. For example, a related art display apparatus, which is configured as a TV, processes broadcast signals transmitted from the outside according to various types of image processing, e.g., tuning and decoding, to provide images of broadcast channels desired by users.

A related art may display apparatus displays various kinds and formats of user interface (UI) images to provide user convenience. The UI images may enable a user to give the display apparatus instructions about desired functions and operations. The UI images may include various types of preset objects, i.e., icons or hyperlinks, and a pointer or cursor moving within an image to select the preset objects. The user manipulates a remote controller or a pointing device, which is configured to be separate from the display apparatus, thereby moving the pointer arbitrarily within the image to select an object.

However, when small objects are disposed close to each other in a UI image, or the pointer is too large to select a small object, the user may not easily move the pointer to a particular object. In this respect, there is a demand for a pointer moving control method, based on a user intent for the display apparatus.

SUMMARY

An aspect of an exemplary embodiment may provide a display apparatus including: a display device; an image processing device which processes an image signal to display an image on the display device; a detection device which detects a motion of a user; and a controller which moves a pointer corresponding to the motion detected by the detection device in a preset first mode, the pointer being displayed on the image, and moves the pointer in a preset second mode, which is different from the first mode, in response to a distance between a position where the motion is detected by the detection device and the display apparatus being changed.

The controller may operate in the first mode in response to the distance being longer than a preset value, and may operate in the second mode in response to the distance between the position where the motion is detected by the detection device and the display apparatus being the preset value or shorter.

The detection device may detect an angle change or a movement amount by the motion, and the controller may move the pointer corresponding to the angle change or the movement amount detected by the detection device.

The detection device may include a camera taking a picture of the user, and the controller may move the pointer corresponding to the motion detected by the camera.

The display apparatus may further include a pointing device, which is separated from the display apparatus and configured to be grasped by the user, and the detection device may be installed in the pointing device to detect the motion of the pointing device.

The second mode may move the pointer more precisely than the first mode.

A difference between the first mode and the second mode may include at least one difference in a unit moving distance of the pointer, a style of the pointer, a size of the pointer, and a size of at least one object in the image selected by the pointer.

The controller may set a unit moving distance, of the pointer corresponding to a predetermined movement amount of the motion, to be shorter in the second mode than in the first mode.

The controller may set a size of the pointer to be smaller in the second mode than in the first mode.

The controller may set the pointer in a second style in the second mode, which is different from a first style in the first mode.

The image may include at least one object configured to be selected by the pointer, and the controller may set a size of the at least one object to be larger in the second mode than in the first mode.

Another aspect of an exemplary embodiment may provide a control method of a display apparatus including: detecting a motion of a user; moving a pointer corresponding to the motion in a preset first mode, the pointer being displayed on an image; and moving the pointer in a preset second mode, which is different from the first mode, in response to a distance between a position where the motion is detected and the display apparatus being changed.

The moving the pointer in the second mode may include moving the pointer in the first mode in response to the distance between the position where the motion is detected and the display apparatus being longer than a preset value, and moving the pointer in the second mode in response to the distance between the position where the motion is detected and the display apparatus being the preset value or shorter.

The detecting the motion of the user may include detecting an angle change or a movement amount by the motion, and the moving the pointer may include moving the pointer corresponding to the angle change or the movement amount detected.

The detecting the motion of the user may include taking a picture of the user by a camera, and the moving the pointer may include moving the pointer corresponding to the motion detected by the camera.

The detecting the motion of the user may include detecting the motion of a pointing device, which is separated from the display apparatus and be configured to be grasped by the user.

The second mode may move the pointer more precisely than the first mode.

A difference between the first mode and the second mode may include at least one difference in a unit moving distance of the pointer, a style of the pointer, a size of the pointer, and a size of at least one object in the image selected by the pointer.

The moving the pointer in the second mode may include moving the pointer such that a unit moving distance, of the pointer corresponding to a predetermined movement amount of the motion, is shorter in the second mode than in the first mode.

The moving the pointer in the second mode may include setting the pointer to have a smaller size in the second mode than in the first mode.

The moving the pointer in the second mode may include displaying the pointer in a second style in the second mode, which is different from a first style in the first mode.

The image may include at least one object configured to be selected by the pointer, and the moving the pointer in the second mode may include displaying the at least one object to have a larger size in the second mode than in the first mode.

Another aspect of an exemplary embodiment may provide a display apparatus including: a display device; an image processing device which processes an image signal to display an image on the display device; a detection device which detects a motion of a user; and a controller which moves a pointer displayed in the image corresponding to the motion detected by the detection device in a preset first mode, and moving the pointer in a preset second mode, which enables a more precise manipulation of the pointer than the first mode, in response to a position where the motion is detected by the detection device is within a preset range from the display apparatus.

Another aspect of an exemplary embodiment may provide a display apparatus including: a display device; an image processing device which processes an image signal to display an image on the display device; a detection device which detects a motion of a user; and a controller which moves a pointer displayed in the image corresponding to the motion detected by the detection device, and changes at least one of a moving style and a display mode of the pointer, corresponding to whether a position where the motion is detected by the detection device is within a preset range from the display apparatus.

Another aspect of an exemplary embodiment may provide a display apparatus including: a display device; an image processing device which processes an image signal to display an image on the display device; a detection device which detects a motion in a body part of a user; and a controller which moves a pointer displayed in the image corresponding to the motion detected by the detection device in a preset second mode, which is different from a first mode, in response to a position where the motion is detected by the detection device being within a preset range from the display device.

BRIEF DESCRIPTION OF THE DRAWINGS

The above and/or other aspects will become apparent and more readily appreciated from the following description of the exemplary embodiments, taken in conjunction with the accompanying drawings, in which:

FIGS. 7 to 10 illustrate images provided by the display apparatus of FIG. 1 in a first mode and a second mode.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

Figure 1:
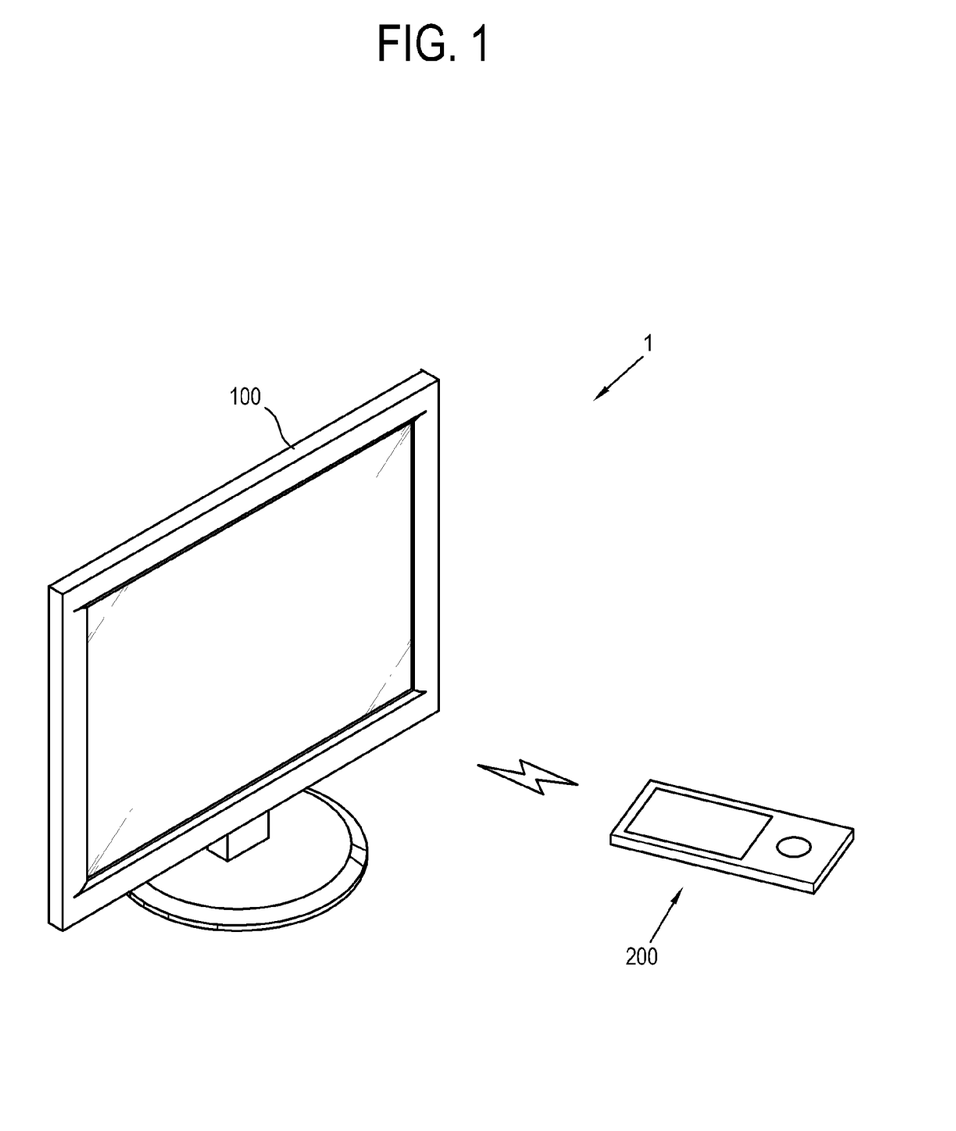
FIG. 1 illustrates a display system according to a first exemplary embodiment.

FIG. 1 illustrates a display system 1 according to a first exemplary embodiment.

As shown in FIG. 1, the display system 1 according to the present embodiment includes a display apparatus 100, which processes an image signal according to a preset image processing process to display an image, and an input device 200 which generates and transmits preset commands corresponding to various operations to the display apparatus 100, such that the operations of the display apparatus 100 are remotely controlled.

In the present embodiment, the display apparatus 100 is configured as a TV, which is capable of displaying an image based on an image signal/image data/image information received from an external image source (not shown) or internally stored. The input device 200 is configured as a remote controller of the TV.

However, the present embodiment may be also applied to a display apparatus 100 having a different structure. For example, a different structure may be a configuration in which the display apparatus 100 is a monitor connected to a main computer (not shown), and the input unit 200 is a system communicating with the main computer. In other words, the following embodiment is provided for illustrative purposes only, and is not construed as limiting the scope of the embodiment.

The display apparatus 100 may display any kind of image, without being particularly limited. For example, the image may include videos, still images, applications, on-screen display (OSD), and graphic user interface (GUI) for controlling various operations.

The input device 200 enables wireless communication with the display apparatus 100, and is provided as an external device which is manipulated and held by a user. The input device 200 transmits a preset command or control signal corresponding to a user manipulation to the display apparatus 100.

Hereinafter, configurations of the display apparatus 100 and the input device 200 will be described in detail with reference to FIG. 2.

Figure 2:
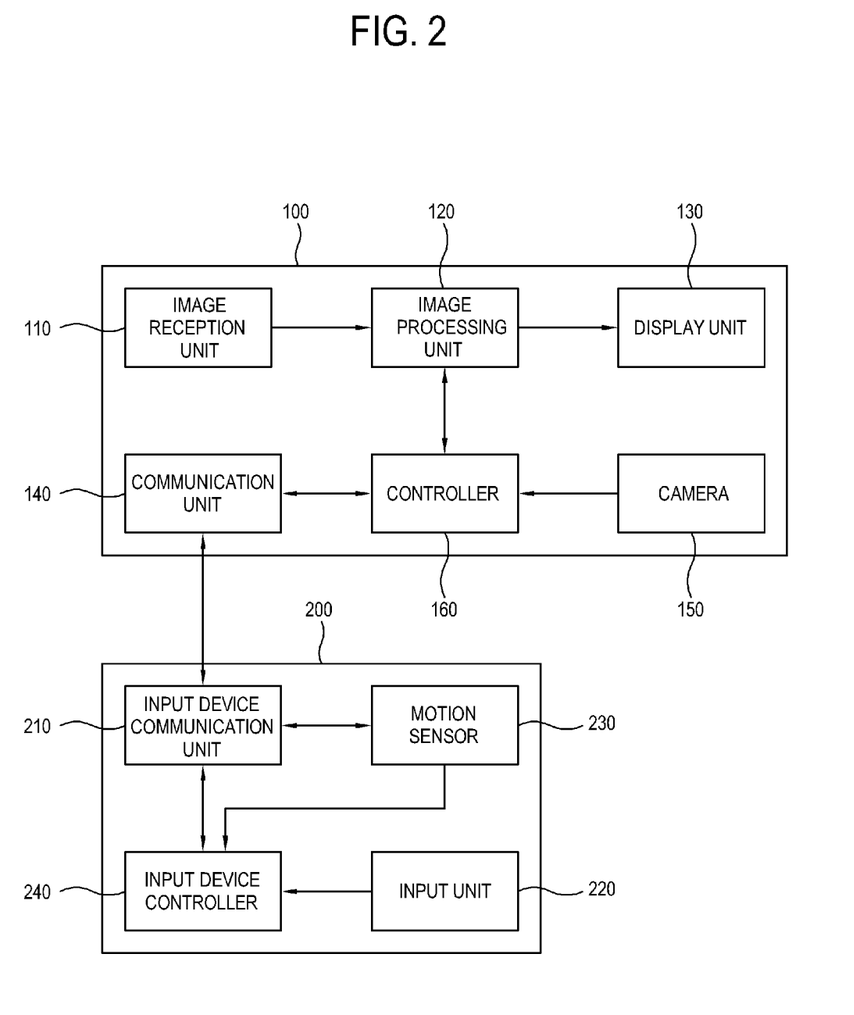
FIG. 2 is a block diagram illustrating configurations of a display apparatus and an input device of FIG. 1.

FIG. 2 is a block diagram illustrating the configurations of the display apparatus 100 and the input device 200.

As shown in FIG. 2, the display apparatus 100 includes an image reception unit 110 receiving an image signal, an image processing unit 120 processing the image signal received by the image reception unit 110, a display unit 130 displaying an image based on the image signal processed by the image processing unit 120, a communication unit 140 communicating with the input device 200, a camera 150 taking a photograph of an external subject, and a controller 160 controlling general operations of components of the display apparatus 100.

As shown in FIG. 2, the input device 200 includes an input device communication unit 210 communicating with the display apparatus 100, an input unit 220 manipulated by the user, a motion sensor 230 detecting a motion of the input device 200, and an input device controller 240 controlling general operations of components of the input device 200.

Hereinafter, each component of the display apparatus 100 will be described.

The image reception unit 110 receives an image signal via a wire or wirelessly from an image source (not shown) and transmits the signal to the image processing unit 120. The image reception unit 110 may be variously configured corresponding to standards of received image signals and configurations of the display apparatus 100. For example, the image reception unit 110 may receive a digital image signal in accordance with a high definition multimedia interface (HDMI) standard or a packet stream of image data from a streaming server (not shown).

The image processing unit 120 processes an image signal received from the image reception unit 110 according to various types of preset image processing processes. The image processing unit 120 outputs the processed image signal to the display unit 130, so that an image, based on the received image signal, is displayed on the display unit 130.

The image processing unit 120 may perform any kind of image processing, without being limited to the exemplary embodiments. For example, image processing may include decoding in accordance with a format of an image signal, de-interlacing to convert an interlaced image signal into a progressive form, scaling to adjust image data to a preset resolution, noise reduction to improve image quality, detail enhancement, and frame refresh rate conversion.

The image processing unit 120 may be provided as an integrated multi-functional component, such as a system on chip (SOC), or as an image processing board (not shown), formed by mounting components which independently conduct individual processes on a printed circuit board.

The display unit 130 displays an image based on an image signal output from the image processing unit 120. The display unit 130 may be configured in various display modes using liquid crystals, plasma, light emitting diodes, organic light emitting diodes, a surface conduction electron emitter, a carbon nano-tube, nano-crystals, etc., without being limited.

The display unit 130 may further include an additional element depending on a display mode thereof. For example, in a display mode using liquid crystals, the display unit 130 may include a liquid crystal display (LCD) panel (not shown), a backlight unit (not shown) providing light to the panel, and a panel drive board (not shown) driving the panel.

The communication unit 140 transmits a command/data/information/signal received from the input device 200 to the controller 160. The communication unit 140 not only receives a signal from the input device 200, which is one-way communication, but may also transmit a command/data/information/signal received from the controller 160 to the input device 200. In this case, the communication unit 140 conforms to a wireless communication standard, e.g., a radio frequency (RF) specification, Zigbee, or Bluetooth, to realize two-way communication between the display apparatus 100 and the input device 200.

The camera 150 may film or take a picture of various subjects, such as a user, in a particular direction based on the display apparatus 100. For example, the particular direction may be in front of the display apparatus 100. The camera 150 films a subject to generate a moving image of the subject, or takes a picture of a subject to generate a still image of the subject. The camera 150 transmits the moving image or still image of the subject to the controller 160.

The controller 160 controls an operation of the display apparatus 100 in accordance with a command transmitted to the communication unit 140. For example, when a preset command is received from the input device 200 through the communication unit 140, the controller 160 controls the image processing unit 120 to process an image in accordance with the command. Although the present embodiment shows that the controller 160 and the image processing unit 120 are provided as separate components, the controller 160 and the image processing unit 120 may be configured as a single image processing board (not shown).

Hereinafter, each component of the input device 200 is described.

The input device communication unit 210 transmits a control signal or a command transmitted from the input device controller 240 to the display apparatus 100. The input device communication unit 210 is configured in accordance with a communication protocol corresponding to the communication unit 140. The input device communication unit 210 may be configured to conduct two-way communication with the communication unit 140, in addition to one-way communication to the communication unit 140.

The motion sensor 230 detects a motion of the input device 200 held by the user. For example, the motion of the input device 200 may be a slope or a change of the input device 200, based on a current position of the input device 200. The motion sensor 230 detects a movement of the input device 200 in a preset triaxial coordinate system. The preset triaxial coordinate system may be a three-dimensional coordinate system with width, length, and height or x, y, and z-axes. The motion sensor 230 may be configured as a gyro sensor, an inertial sensor, or an acceleration sensor.

The input unit 220 is configured to be manipulated by the user, thereby enabling the input device controller 240 to generate a command/control signal corresponding to user manipulation. The input unit 220 is configured as various forms. For example, the various forms of the input unit 220 may include a menu key/button, a touch pad, or a touchscreen.

The motion sensor 230 may enable the input device controller 240 to quantitatively determine a movement amount of the input device 200. For example, when the input device 200 moves from a first location to a second location, the motion sensor 230 calculates a movement distance between the first location and the second location. Accordingly, the input device controller 240 determines the movement amount of the input device 200. Alternatively, when the input device 200 rotates from a first angle to a second angle, the motion sensor 230 calculates a difference between the first angle and the second angle. Accordingly, the input device controller 240 determines an angle change of the input device 200.

When user manipulation happens through the input unit 220, the input device controller 240 transmits a control signal corresponding to the manipulation to the input device communication unit 210. Therefore, the control signal is transmitted to the display apparatus 100. Further, the input device controller 240 generates a control signal corresponding to a motion of the input device 200 detected by the motion sensor 230, and transmits the control signal to the display apparatus 100. Accordingly, an operation corresponding to the motion is carried out in the display apparatus 100.

In this configuration, the display apparatus 100 may move a pointer according to a control signal received from the input device 200, while displaying an image including the pointer. The input device 200 may generate a control signal in accordance with manipulation through the input unit 220, or a motion of the input device 200 detected by the motion sensor 230. In the present embodiment, the latter case will be illustrated.

Figure 3:
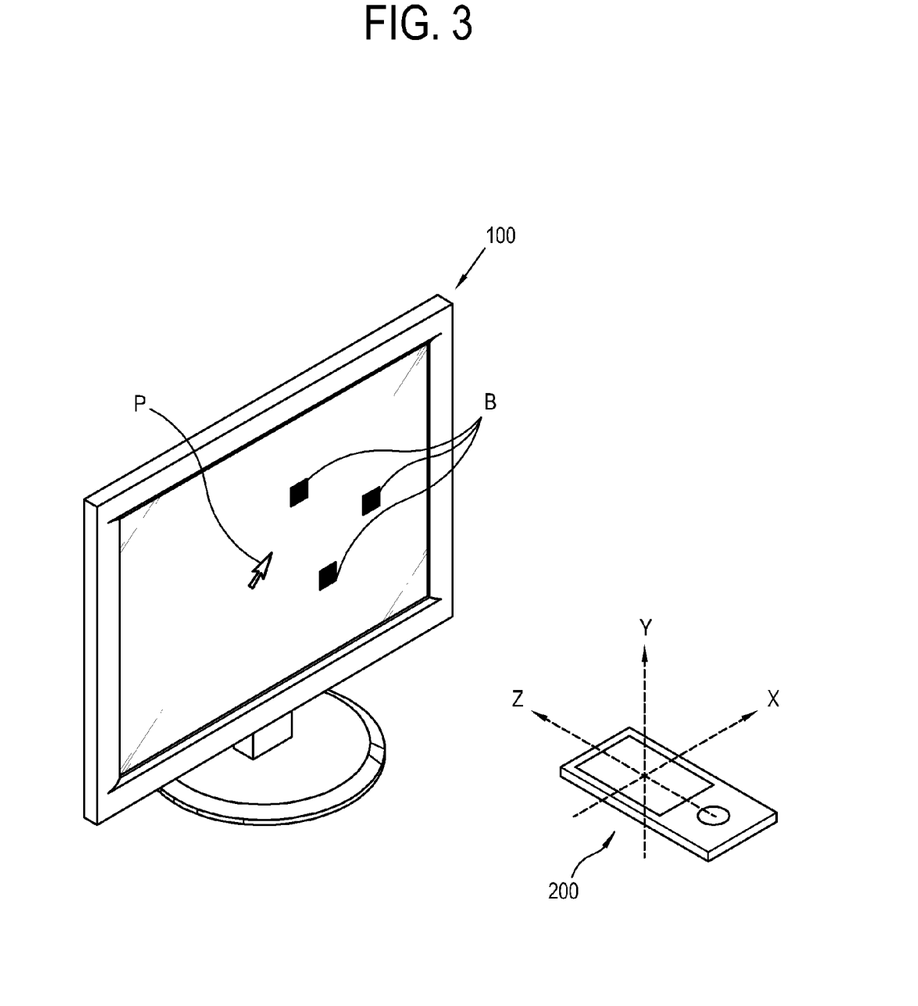
FIGS. 3 to 5 illustrate moving a pointer in an image based on a motion of the input device of FIG. 1.
Figure 4:
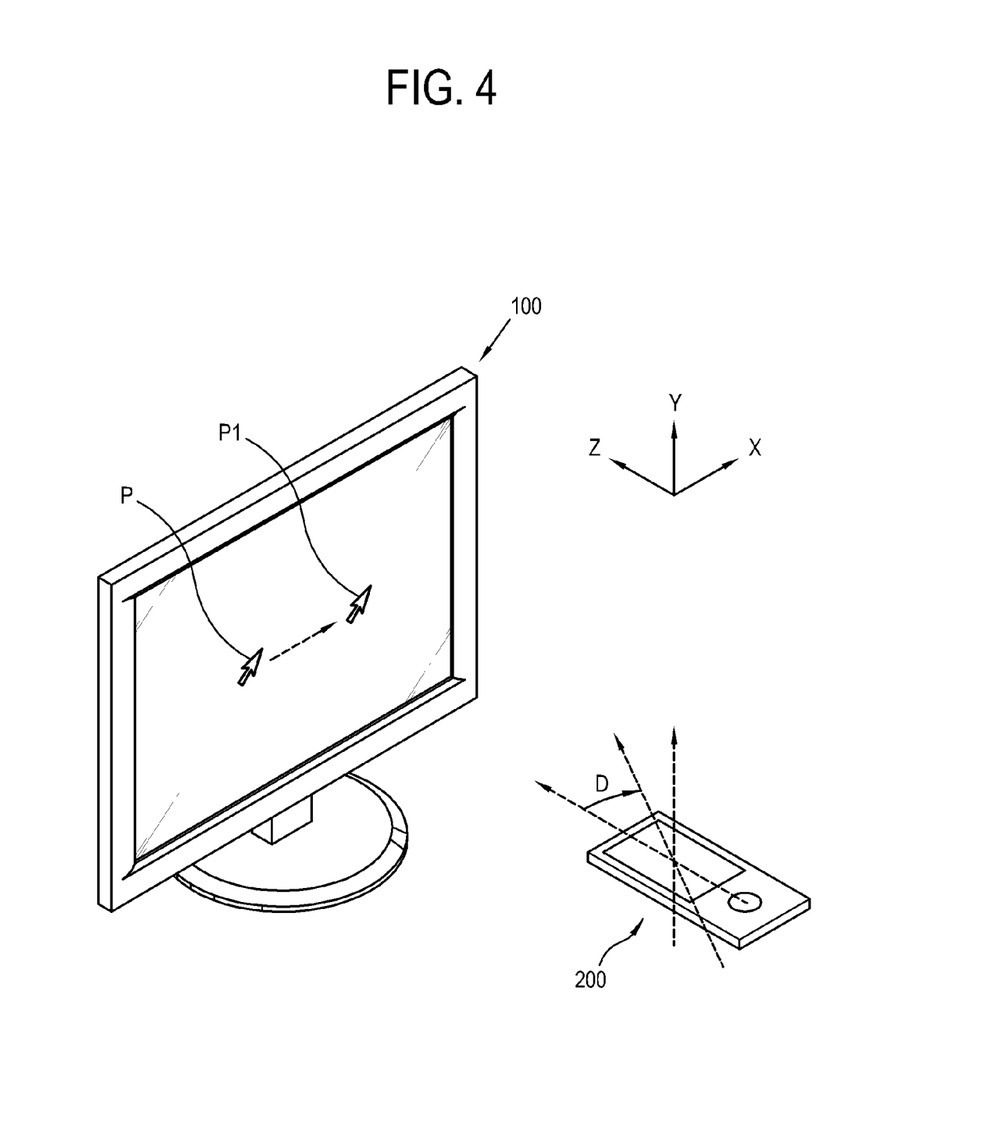
Figure 5:
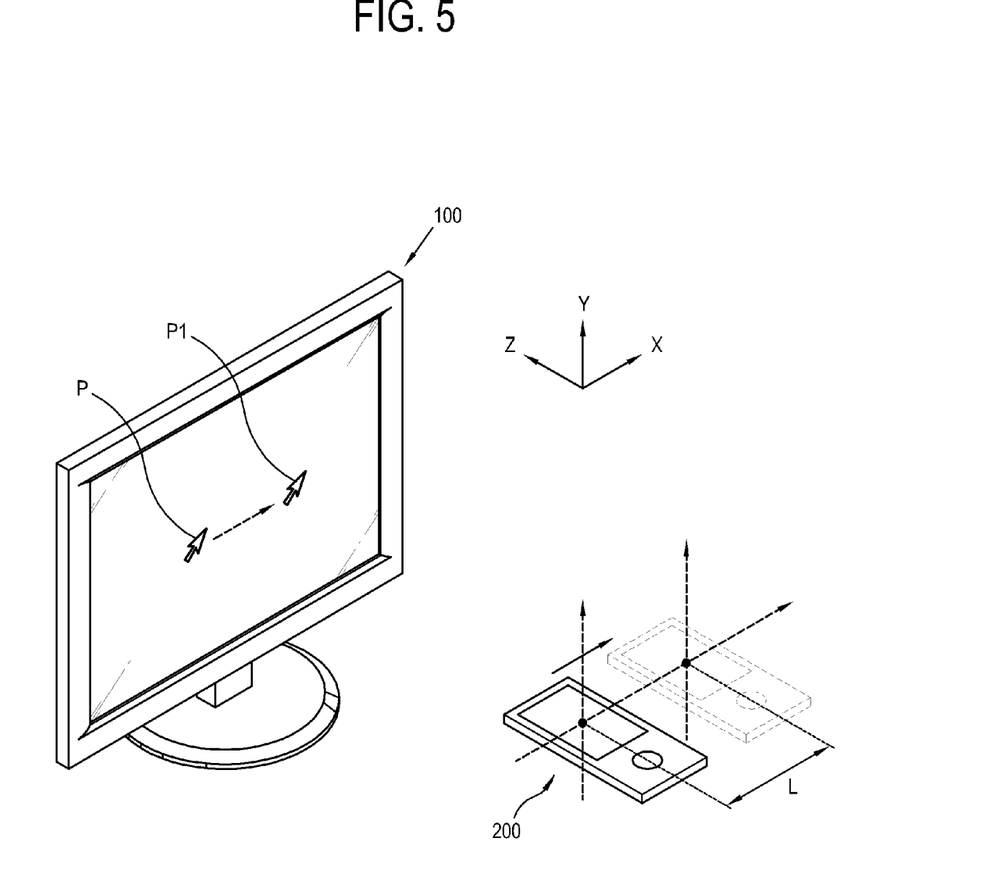

FIGS. 3 to 5 illustrate moving a pointer P in an image based on a motion of the input device 200.

As shown in FIG. 3, the display apparatus 100 displays an image including various objects B and the pointer P. The pointer P may move within the image, and overlap an object B. When a click command is implemented in the input device 200 while the pointer P is overlapping a particular object B, a preset operation corresponding to the object B is carried out.

For example, when the displayed image is a web page, the object B may be a hyperlinked text or image. When the pointer moves onto and clicks on the object B, a web page linked to the object B may be displayed. Alternatively, when the display image is a user interface (UI) image of a desktop, the object B may be a selection menu item or icon.

When the user holds and moves the input device 200, a motion of the input device 200 occurs in the three-dimensional coordinate system. As shown in FIG. 3, the three-dimensional coordinate system includes x, y, and z-axes, which are perpendicular to each other.

In the present embodiment, the x-axis is parallel with a width direction of the image displayed on the display apparatus 100, while the y-axis is parallel with a length direction of the image. In other words, the image is disposed parallel with an x-y plane.

Accordingly, the z-axis is perpendicular to the image or the display apparatus 100. In other words, moving the input device 200 along the z-axis means that the input device 200 becomes close to or distant from the image or the display apparatus 100.

The triaxial coordinate system, as disclosed above, is provided clarifying the present embodiment, and will be used throughout the description of the present embodiment.

To move the pointer P within the image, the user moves the input device 200 in consideration of a moving direction and a movement amount of the pointer P.

As shown in FIG. 4, the display apparatus 100 moves the pointer P corresponding to a rotation of the input device 200.

When the input device 200 rotates by an angle D in a predetermined direction from an initial position, the input device 200 detects a rotation direction and a rotation angle of the input device 200 using the motion sensor 230. The input device 200 calculates a moving direction and a moving distance of the pointer P based on the rotation direction and the rotation angle of the input device 200 and transmits a command to move the pointer P (e.g., "move command") including the moving direction and the moving distance of the pointer P to the display apparatus 100.

The display apparatus 100 moves the pointer P to a position P1 based on the move command received from the input device 200.

Correspondence between the rotation direction of the input device 200 and the moving direction of the pointer P, and correspondence between the rotation angle of the input device 200 and the moving distance of the pointer P, may be designed in various ways in the present embodiment.

For example, when the input device 200 rotates right about the y-axis on an xz plane, the pointer P is set up to move exactly right. When the input device 200 rotates slantly toward a top left on the xz plane, the pointer P is set up to move to the top left. Further, when the input device 200 rotates by 1 degree, the pointer P is set up to move by 10 pixels.

In another exemplary embodiment shown in FIG. 5, the display apparatus 100 may move the pointer P according to a positional change of the input device 200.

When the input device 200 is moved right by a predetermined distance of L from an initial position, the input device 200 detects a moving direction and a moving distance of the input device 200 using the motion sensor 230. The input device 200 calculates a moving direction and a moving distance of the pointer P based on the moving direction and the moving distance of the input device 200 and transmits a command to move the pointer P including the moving direction and the moving distance of the pointer P to the display apparatus 100.

The display apparatus 100 moves the pointer P to a position P1 based on the move command received from the input device 200.

Similar to FIG. 4, correspondence between the moving direction of the input device 200 and the moving direction of the pointer P, and correspondence between the moving distance of the input device 200 and the moving distance of the pointer P, may be designed in various ways in realizing the present embodiment.

For example, when the input device 200 moves parallel with the x-y plane, the pointer P is also set up to move in a direction corresponding to the moving direction of the input device 200. Further, when the input device 200 moves by 10 cm, the pointer P is set up to move by 100 pixels.

In a related art configuration of moving the pointer P based on a motion of the input device 200, a moving distance of the pointer P is fixed based on a moving distance of the input device 200. Thus, the user is requested to accurately move the input device 200 for precise movement of the pointer P.

For example, in the related art configuration, when an image includes small objects B or short intervals between objects B in an image, a shorter unit moving distance of the pointer P based on a predetermined movement amount of the input device 200 is suitable to move the pointer accurately in order to choose an object B with the pointer P. When the unit moving distance of the pointer P is long, the user may allow the pointer P to pass by a desired object B when moving the input device 200.

On the contrary, in the related art configuration, it may not be needed to precisely and delicately move the pointer P. In this instance, a longer unit moving distance of the pointer P is rather convenient for the user, whereas a shorter unit moving distance of the pointer P may cause inconvenience in that the user moves the input device 200 to an excessive extent in order to move the pointer P to a desired position.

Considering these aspects, the following method and configuration are suggested in the present embodiment.

Figure 6:
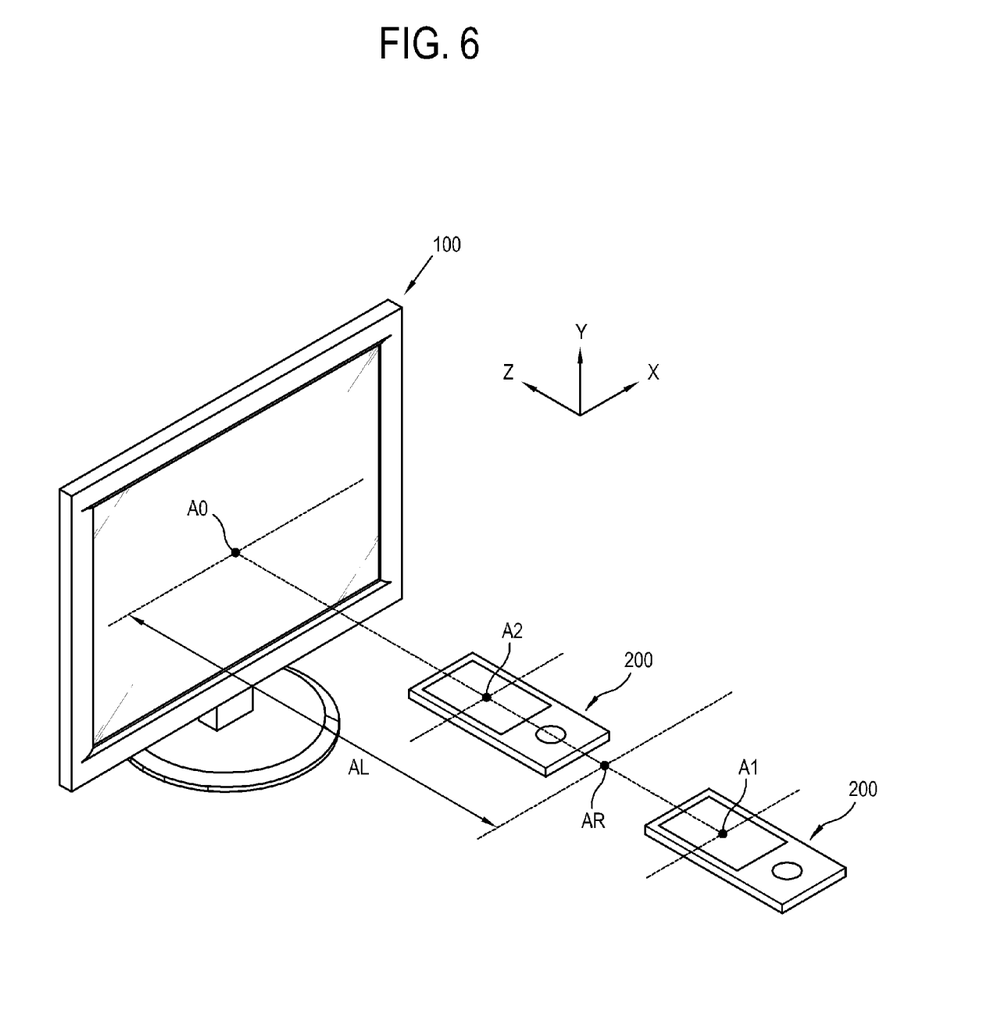
FIG. 6 illustrates a location of the input device based on a distance of the input device from the display apparatus of FIG. 1.

FIG. 6 illustrates positions of the input device 200 based on a distance from the display apparatus 100.

As shown in FIG. 6, the display apparatus 100 has a preset reference point AR, spaced by a preset reference distance AL along the z-axis, from an origin A0, at which the display apparatus 100 is disposed. The distance AL may be variously determined based on a configuration of the display apparatus 100, without being limited to a particular value.

When a motion of the input device 200 is made, the display apparatus 100 determines a distance between a position at which the motion is detected and the display apparatus 100. When the determined distance is longer than the reference distance AR, the display apparatus 100 moves the pointer P in a preset first mode. When the determined distance is shorter than the reference distance AR, the display apparatus 100 moves the pointer P in a preset second mode, which is different from the first mode. In an operation of moving the pointer P, the first mode is a normal mode, and the second mode is a precise mode to move the pointer P precisely.

In other words, when the position A1 where the motion of the input device 200 occurs, is out of a range from the origin A0 to the reference point AR, the display apparatus 100 moves the pointer P in the normal mode. However, when the position A2 where the motion of the input device 200 occurs is within the range from the origin A0 to the reference point AR, the display apparatus 100 moves the pointer P in the precise mode. When the input device 200 is moved out of the range from the origin A0 to the reference point AR during the precise mode, the display apparatus 100 changes from the precise mode to the normal mode.

Accordingly, the pointer P may be selectively manipulated either in the normal mode or in the precise mode based on a user intent. In general, people approach an object to conduct a precise operation on the object. Thus, in the present embodiment, when the input device 200 is positioned close to the display apparatus 100, i.e., when the user approaches the display apparatus 100, the pointer P is operated in the precise mode. Accordingly, the user behaves intuitively in accordance with the present embodiment, without special training.

The distance between the position at which the motion of the input device 200 is detected and the display apparatus 100, i.e., the position A1 or A2 from the origin A0, may be determined by various methods. For example, the camera 150 of the display apparatus 100 is installed in a stereo mode, to determine the position of the input device 200 by triangulation at a moment when the motion of the input device 200 is made.

Meanwhile, the preceding modes include settings for various environments related to the pointer P, e.g., a moving style of the pointer P, a display mode of the pointer P, and a display mode of an object B.

At least some of these settings are different depending on the first mode and the second mode. The second mode enables the pointer P to move relatively more precisely than the first mode.

Hereinafter, a configuration as the display apparatus 100 switches from the first mode to the second mode, when the input device 200 moves from the position A1 to the position A2, will be described with reference to FIGS. 7 to 10.

FIGS. 7 to 10 illustrate images displayed on the display apparatus 100 in the first mode and the second mode. Left images of FIGS. 7 to 10 are provided in the first mode, and right images are provided in the second mode. The illustrated images may be applied alone, or as combinations when switching from the first mode to the second mode.

As shown in FIG. 7, when switching from the first mode to the second mode, the display apparatus 100 sets a size of a pointer P4, in the second mode to be smaller than a pointer P3, in the first mode.

A relatively small size of the pointer P4 makes it easy to select a small object in an image as compared with a relatively large size of the pointer P3.

Figure 8:
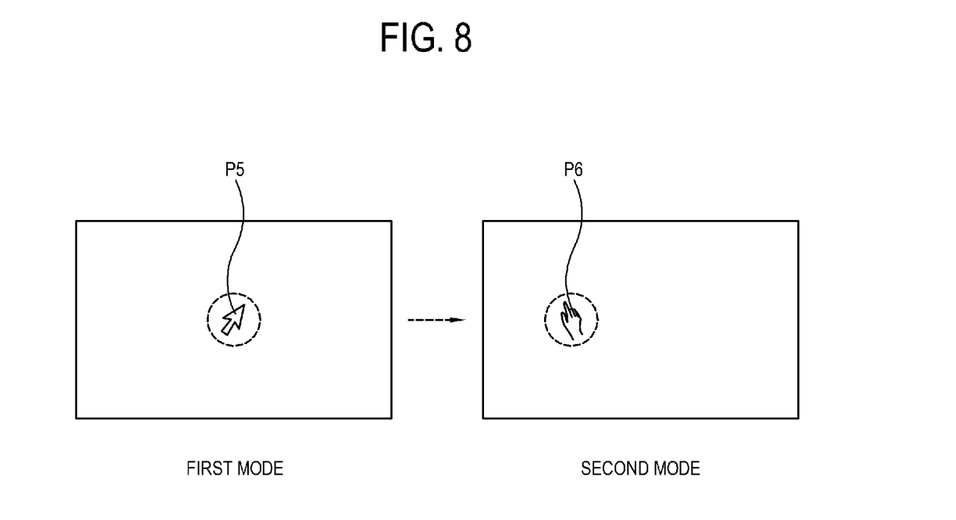

As shown in FIG. 8, the display apparatus 100 may set a pointer P5 in the first mode, and a pointer P6 in the second mode, in a different style, as compared to the first mode. A style includes various parameters related to a display mode of the pointers P5 and P6, e.g., a shape and a color.

Figure 9:
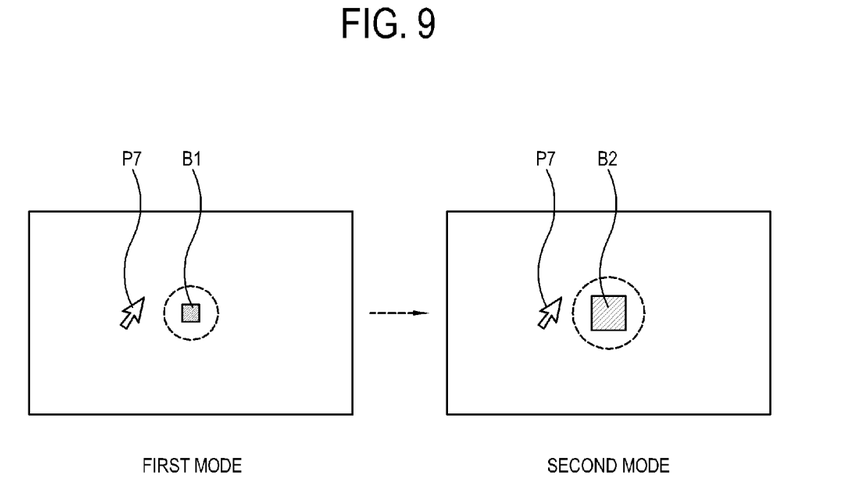

As shown in FIG. 9, the display apparatus 100 may adjust a display mode of objects B1 and B2 in an image, leaving a pointer P7 intact. The display apparatus 100 sets the object B1 in the second mode to be larger than the object B2 in the first mode.

A relatively large size of the object B2 makes it easier for the pointer P7 to select the object B2. In other words, a relatively large size of the object B2 enables a precise manipulation of the pointer P7.

Figure 10:
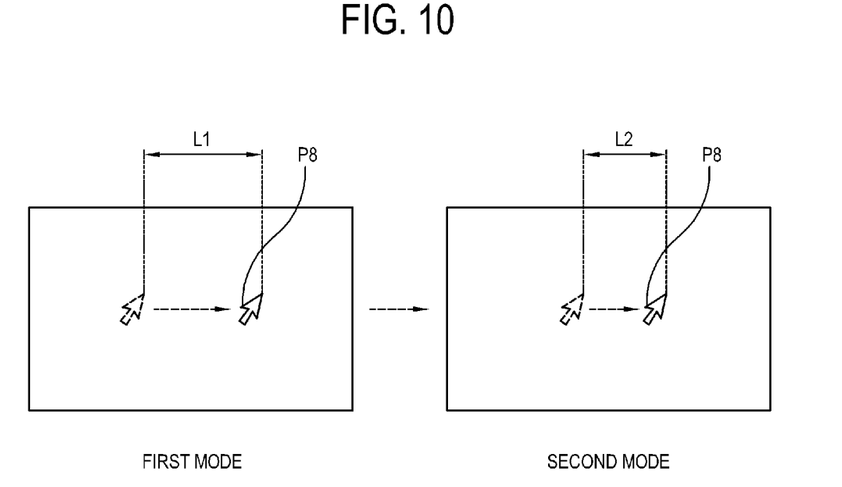

As shown in FIG. 10, the display apparatus 100 does not change a display mode of a pointer P8 or an image. Instead, the display apparatus 100 sets a unit moving distance of the pointer P8 corresponding to a predetermined movement amount of the input device 200 to be shorter in the second mode, as compared to the first mode.

In other words, for the same movement amount of the input device 200, a moving distance L2 of the pointer P8 in the second mode is shorter than a moving distance L1 of the pointer P8 in the first mode. In other words, a movement of the pointer P8 is less sensitive to a motion of the input device 200 in the second mode, as compared to the first mode. Therefore, in the second mode the pointer P8 is moved more precisely, as compared to the first mode.

In the foregoing embodiment, the user holds the input device 200 and makes a motion of the input device 200. In this case, the input device 200 generates a control signal corresponding to the motion of the input device 200, and transmits the control signal to the display apparatus 100. The display apparatus 100 moves the pointer P based on the control signal received from the input device 200.

However, the idea of the present embodiment may be modified variously, without being limited to the foregoing example. For example, the display apparatus 100 may detect an action/motion of a user without the input device 200, and moves the pointer based on a detection result.

Figure 11:
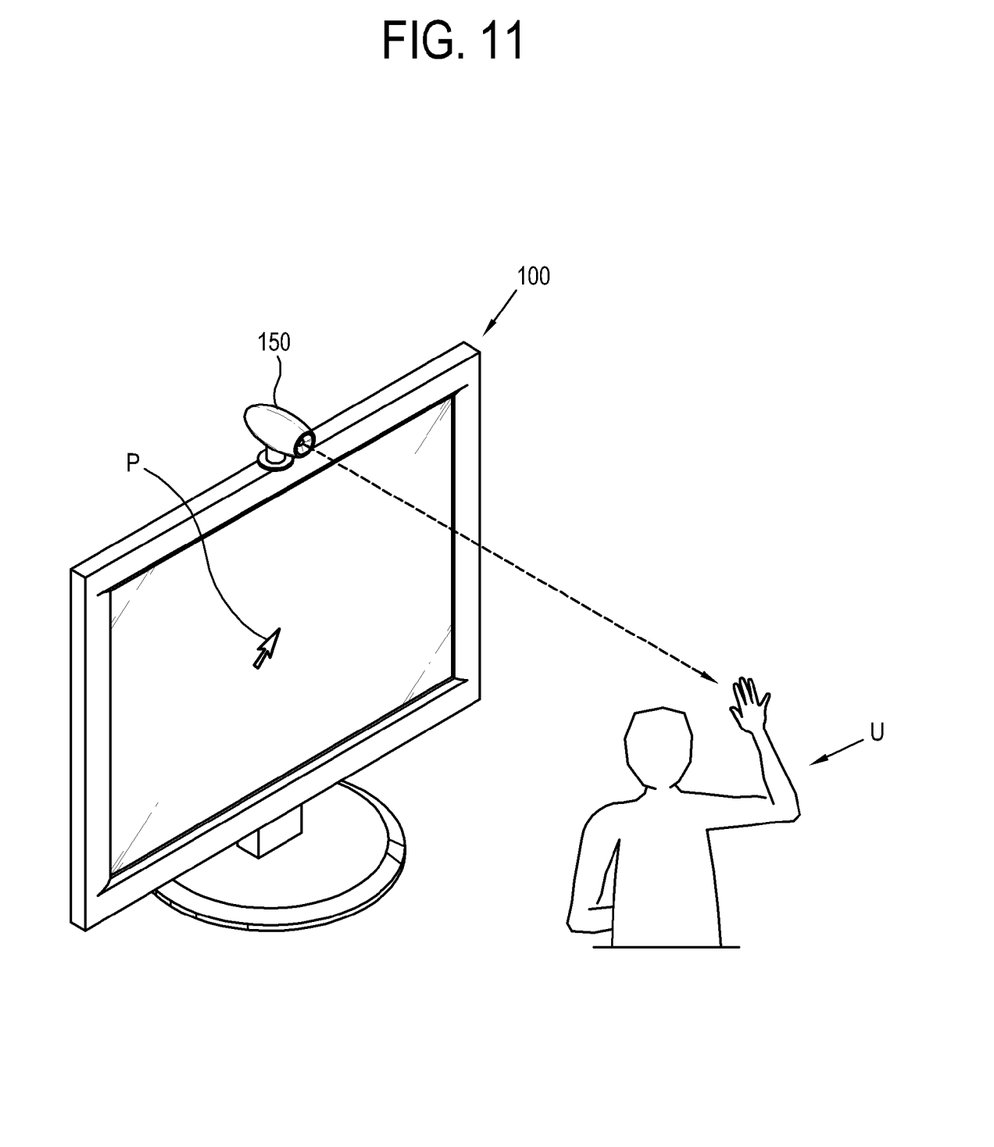
FIG. 11 illustrates that a display apparatus according to a second exemplary embodiment moves a pointer within an image based on a user motion.

FIG. 11 illustrates that a pointer P moves within an image based on a user motion on a display apparatus 100 according to a second exemplary embodiment.

As shown in FIG. 11, the display apparatus 100 includes a camera 150 installed on an outside of the display apparatus 100. The camera 150 may take a picture of a user U in front of the display apparatus 100, and detect an action or motion of the user U.

The camera 150 may focus on a specific body part, instead of a figure of the user U, and detect a motion of the part. For example, the camera 150 detects a motion of a hand of the user U, and a controller 160 of the display apparatus 100 calculates a moving direction and a movement amount of the hand based on a detection result. The controller 160 moves the pointer P based on calculated information, which has been described in detail above in the first embodiment. Thus, a description of moving the pointer P is omitted herein.

The display apparatus 100 determines whether a position where the motion of the user U is detected is within a preset range from the display apparatus 100. When the position is out of the range, the display apparatus 100 moves the pointer P in a first mode, which is a normal mode. When the position is within the range, e.g., when the user U is making a motion relatively close to the display apparatus 100, the display apparatus 100 moves the pointer P in a second mode, which is a precise mode.

The first mode and the second mode have been described above in the first embodiment. Thus, descriptions thereof are omitted herein.

As described above, without the input device 200 as described in the first embodiment, the camera 150 detects a motion of the user U. Accordingly, the display apparatus 100 may achieve the purpose of the exemplary embodiments.

A control method of a display apparatus 100, according to a third exemplary embodiment will be described with reference to FIG. 12. The display apparatus 100 of the third embodiment has a configuration substantially the same as those of the first embodiment and the second embodiment.

Figure 12:
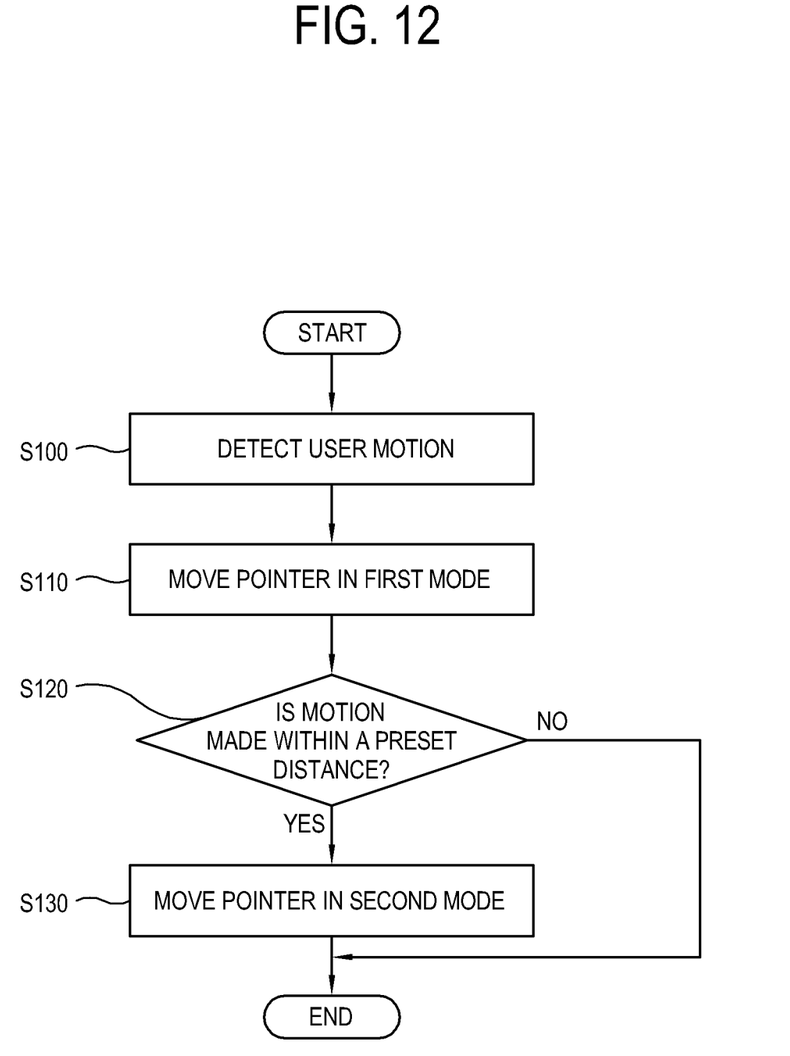
FIG. 12 is a flowchart illustrating a control method of a display apparatus according to a third exemplary embodiment.

FIG. 12 is a flowchart illustrating the control method of the display apparatus 100 according to the third exemplary embodiment. In an initial state, a user is positioned out of a preset range from the display apparatus 100.

As shown in FIG. 12, the display apparatus 100 detects a motion of the user (S100). The display apparatus 100 moves a pointer P corresponding to the motion of the user in a first mode (S110).

The display apparatus 100 monitors whether the motion of the user occurs within the preset range. When the motion of the user occurs within the preset range (S120), the display apparatus 100 switches from the first mode to a second mode, and moves the pointer P corresponding to the motion of the user in the second mode (S130).

In FIG. 12, the display apparatus 100 may provide an environment for controlling a movement of the pointer P based on a user intent.

The display apparatus 100 may determine whether a position where the motion occurs is within the preset range when detecting the motion of the user. The display apparatus 100 selects the first mode when the position is detected out of the preset range. Further, the display apparatus 100 selects the second mode when the position is detected within the preset range. The display apparatus 100 controls a movement of the pointer P corresponding to the motion of the user in the selected mode.

In another exemplary embodiment, at least one of an image reception unit 110, an image processing unit 120, a display unit 130, a communication unit 140, an input device communication unit 210, and an input unit 220 may include a processor for performing their respective functions. Further, at least one of an image reception unit 110, an image processing unit 120, a display unit 130, a communication unit 140, an input device communication unit 210, and an input unit 220 may include a hardware module or a circuit for performing their respective functions.

Although a few exemplary embodiments have been shown and described, it will be appreciated by those skilled in the art that changes may be made in these exemplary embodiments without departing from the principles and spirit of the exemplary embodiments, the scope of which is defined in the appended claims and their equivalents.

What is claimed is:

1. A display apparatus comprising:
    a display unit;
    an image processing unit which processes an image signal to display an image on the display unit; and
    a controller which detects a first motion and a second motion of a pointing device and moves a pointer over the displayed image in a first direction of the first motion, and adjusts at least one of a style of the pointer or a size of at least one object in the image selectable by the pointer, in response to the second motion of the pointing device being detected in a second direction toward or away from the display apparatus, the second direction being intersected with the first direction,
    wherein the controller operates in a first mode in response to a distance between the position where the motion is detected and the display apparatus being longer than a preset value, and operates in a second mode in response to the distance being the preset value or shorter.

2. The display apparatus of claim 1, wherein a detection device detects an angle change or a movement amount by the motion, and the controller moves the pointer corresponding to the angle change or the movement amount detected by the detection device.

3. The display apparatus of claim 1, wherein a detection device comprises a camera taking a picture of the user, and the controller moves the pointer corresponding to the motion detected by the camera.

4. The display apparatus of claim 1, wherein the pointing device is separated from the display apparatus, configured to be grasped by the user, and configured to transmit signals corresponding to the first motion and the second motion thereof to the display apparatus.

5. The display apparatus of claim 1, wherein the second mode moves the pointer more precisely than the first mode.

6. The display apparatus of claim 1, wherein a difference between the first mode and the second mode comprises at least one difference in a style of the pointer, and a size of at least one object in the image selected by the pointer.

7. The display apparatus of claim 1, wherein the controller sets a unit moving distance, of the pointer corresponding to a predetermined movement amount of the motion, to be shorter in the second mode than in the first mode.

8. The display apparatus of claim 1, wherein the controller sets a size of the pointer to be smaller in the second mode than in the first mode.

9. The display apparatus of claim 1, wherein the controller sets the pointer in a second style in the second mode, which is different from a first style in the first mode.

10. The display apparatus of claim 1, wherein the controller adjusts the at least one object to vary in size.

11. A control method of a display apparatus comprising:
    detecting a first motion and a second motion of a user;
    moving a pointer over the displayed image in a first direction of the first motion; and
    adjusting at least one of a style of the pointer or a size of at least one object in the image selectable by the pointer, in response to the second motion of the user is detected in a second direction toward or away from the display apparatus, the second direction being intersected with the first direction,
    wherein the adjusting comprises operating in a first mode in response to a distance between the position where the motion is detected and the display apparatus being longer than a preset value, and operating in a second mode in response to the distance between the position where the motion is detected and the display apparatus being the preset value or shorter.

12. The control method of claim 11, wherein the detecting the motion of the user comprises detecting an angle change or a movement amount by the motion, and the moving the pointer comprises moving the pointer corresponding to the angle change or the movement amount detected.

13. The control method of claim 11, wherein the detecting the motion of the user comprises taking a picture of the user by a camera, the moving the pointer comprises moving the pointer corresponding to the motion detected by the camera.

14. The control method of claim 11, wherein the detecting the motion of the user comprises detecting the motion of a pointing device, which is separated from the display apparatus and is configured to be grasped by the user.

15. The control method of claim 11, wherein the second mode moves the pointer more precisely than the first mode.

16. The control method of claim 11, wherein a difference between the first mode and the second mode comprises at least one difference in, a style of the pointer, and a size of at least one object in the image selected by the pointer.

17. The control method of claim 11, wherein the adjusting comprises moving the pointer such that a unit moving distance, of the pointer corresponding to a predetermined movement amount of the motion, is shorter in the second mode than in the first mode.

18. The control method of claim 11, wherein the adjusting comprises setting the pointer to have a smaller size in the second mode than in the first mode.

19. The control method of claim 11, wherein the adjusting comprises displaying the pointer in a second style in the second mode, which is different from a first style in the first mode.

20. The control method of claim 11, wherein the image comprises at least one object configured to be selected by the pointer, and the adjusting comprises displaying the at least one object to vary in size.

21. A display apparatus comprising:
a display unit;
an image processing unit which processes an image signal to display an image on the display unit; and
a controller which detects a motion of a pointing device and moves a pointer displayed in the image in a direction corresponding to the motion detected, and adjusting at least one of a style of the pointer or a size of at least one object in the image selected by the pointer, in response to a position where the motion is detected being within a preset range in a direction intersected with the moving direction of the pointer from the display apparatus,
wherein the style of the pointer comprises at least one of a color and a shape of the pointer, and
wherein the controller operates in a first mode in response to a distance between the position where the motion is detected and the display apparatus being longer than a preset value, and operates in a second mode in response to the distance being the preset value or shorter.

22. A display apparatus comprising:
a display unit;
an image processing unit which processes an image signal to display an image on the display unit; and
a controller which detects a motion of a pointing device and moves a pointer displayed in the image in a direction corresponding to the motion detected, and changing at least one of a moving style or a size of the pointer, corresponding to whether a position where the motion is detected is within a preset range in a direction intersected with the moving direction of the pointer from the display apparatus,
wherein the controller operates in a first mode in response to a distance between the position where the motion is detected and the display apparatus being longer than a preset value, and operates in a second mode in response to the distance being the preset value or shorter.

23. A display apparatus comprising:
a display unit;
an image processing unit which processes an image signal to display an image on the display unit;
a detection device which detects a motion in a body part of a user; and
a controller which changes at least one of a moving style or a size of pointer displayed in the image, in response to a position where the motion is detected by the detection device being within a preset range in a direction intersected with a plane of the display unit from the display unit,
wherein the controller operates in a first mode in response to a distance between the position where the motion is detected and the display apparatus being longer than a preset value, and operates in a second mode in response to the distance being the preset value or shorter.

24. The display apparatus of claim 23, wherein the detection device comprises a camera which is installed on an outside of the display apparatus.

25. The display apparatus of claim 23, wherein the body part of the user comprises a hand.

* * * * *